T. A. WESTON.
Friction-Clutches.

No. 157,662.  Patented Dec. 8, 1874.

Witnesses,
Harry Smith
Hubert Howson

T. A. Weston
by his Attrs
Howson and Son

UNITED STATES PATENT OFFICE.

THOMAS A. WESTON, OF PHILADELPHIA, PENNSYLVANIA, ASSIGNOR TO HIMSELF AND JOHN HEINS, OF SAME PLACE.

IMPROVEMENT IN FRICTION-CLUTCHES.

Specification forming part of Letters Patent No. 157,662, dated December 8, 1874; application filed September 8, 1874.

CASE D.

*To all whom it may concern:*

Be it known that I, THOMAS A. WESTON, of Philadelphia, Pennsylvania, have invented an Improved Brake-Clutch, of which the following is a specification:

The object of my invention is to clutch a driving or driver pulley or wheel to and release it from a shaft by a device which insures safety, and which I will now proceed to explain, reference being had to the accompanying drawing, in which—

Figure 1:
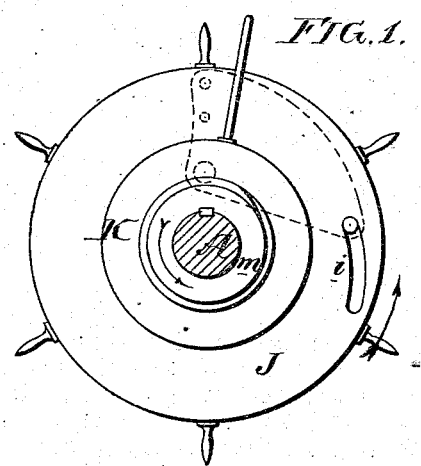
Figure 2:
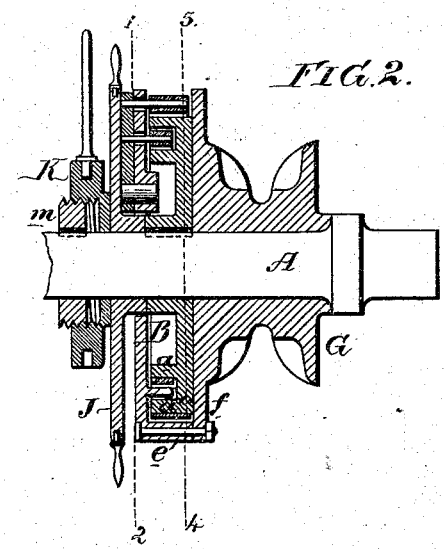
Figure 3:
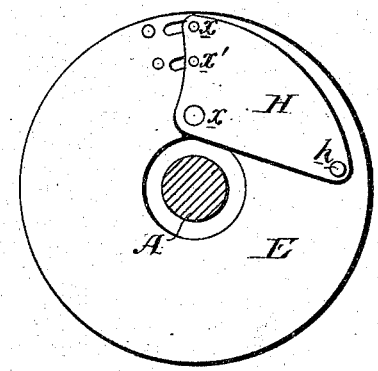
Figure 4:
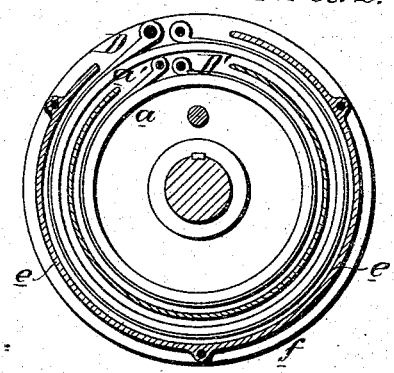
Figure 5:
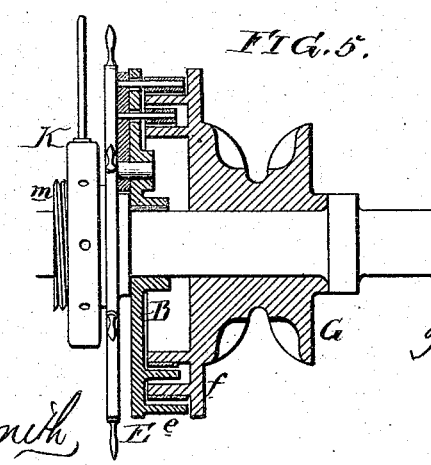

Figure 1 is a side view, and Fig. 2 a sectional view, of the clutching mechanism; Fig. 3 being a section on the line 1 2; Fig. 4, a section on the line 3 4; and Fig. 5, a view of the mechanism, partly in section.

A is a shaft, to which is secured the friction-wheel B, having an inner flange, a, and an outer flange, a', the former being surrounded, or nearly so, by a friction-band, D', and the latter by a friction-band, D. E is a circular plate or disk, having a flange, e, secured to the flange f of the pulley G, which is loose on the shaft, and to the exterior of this disk is pivoted a bell-crank lever, H, one arm of which has a pin, h, passing through a curved slot, i, in a disk, J, which is also loose on the shaft, the slot being arranged eccentrically as regards the center of the shaft. (See Fig. 1.) The short arm of the bell-crank lever has two pins, x x', which pass freely through segmental slots on the disk E. To one pin is connected one end of the friction-band D, and to the other one end of the friction-band D', the opposite ends of both bands being connected to the disk E, which, as before remarked, is secured to the flange f of the pulley G. If the shaft A be revolving in the direction of the arrow, Fig. 1, and friction be applied to the disk J, its eccentric slot will so act on the bell-crank lever H as to simultaneously apply both friction-bands to both flanges of the friction-wheel B, with which the pulley G, as well as the disk J, must consequently revolve. The desired friction is imparted to the disk J, in the present instance, by a nut, K, adapted to a screw-collar, m, secured to the shaft A; but it will be evident that other friction apparatus may be employed to retard the said disk J. G may represent the pulley for driving the shaft A, which it may be desirable to release from or clutch to the said pulley, in order to do which all that is necessary is to impart friction to the disk J when the pulley has to be clutched, or to so operate the said disk that its eccentric slot shall act on the bell-crank lever, expand both friction-bands, and thus release the shaft from the driving-pulley.

The main feature of my invention is the use of two friction-bands, so that if one breaks the other may insure safety in hoisting or driving.

It will be evident that further safety may be insured by the employment of three or more friction-bands in a manner which it will be unnecessary to explain.

I claim as my invention—

The shaft A, pulley or driver G, two or more friction-bands adapted to the friction-wheel B on the said shaft A, and controlled by a bell-crank lever, H, disk J, and its eccentric slot i, all being combined substantially as set forth.

In testimony whereof I have signed my name to this specification in the presence of two subscribing witnesses.

THOS. A. WESTON.

Witnesses:
E. H. BAILEY,
HARRY SMITH.